(12) United States Patent
Seminara

(10) Patent No.: US 9,834,059 B2
(45) Date of Patent: *Dec. 5, 2017

(54) SUSPENSION STRUT FOR A MOTOR VEHICLE WITH A HEIGHT-ADJUSTMENT DEVICE

(71) Applicant: SISTEMI SOSPENSIONI S.p.A., Milan (IT)

(72) Inventor: Massimo Seminara, Asti (IT)

(73) Assignee: SISTEMI SOSPENSIONI S.p.A., Corbetta (Milan) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/022,488

(22) PCT Filed: Sep. 17, 2014

(86) PCT No.: PCT/EP2014/069829
§ 371 (c)(1),
(2) Date: Mar. 16, 2016

(87) PCT Pub. No.: WO2015/040078
PCT Pub. Date: Mar. 26, 2015

(65) Prior Publication Data
US 2016/0229253 A1 Aug. 11, 2016

(30) Foreign Application Priority Data

Sep. 17, 2013 (EP) ..................................... 13184830

(51) Int. Cl.
*B60G 17/06* (2006.01)
*B60G 11/15* (2006.01)
(Continued)

(52) U.S. Cl.
CPC .............. *B60G 17/06* (2013.01); *B60G 11/15* (2013.01); *B60G 11/16* (2013.01); *B60G 15/063* (2013.01);
(Continued)

(58) Field of Classification Search
CPC ........ B60G 15/063; B60G 2204/12422; B60G 2800/914; B60G 2204/1242
See application file for complete search history.

(56) References Cited

U.S. PATENT DOCUMENTS 3,628,810 A * 12/1971 Graef ................. B60G 17/0272
267/177
4,824,180 A * 4/1989 Levrai .................... B60G 11/52
188/195

(Continued)

FOREIGN PATENT DOCUMENTS

| DE | 102004032083 A1 | 1/2006 |
|---|---|---|
| FR | 2695875 A1 | 3/1994 |
| WO | 2012/156418 A1 | 11/2012 |

OTHER PUBLICATIONS

International Search Report and Written Opinion of the International Searching Authority dated Oct. 29, 2014 for PCT International Application No. PCT/EP2014/069829.

(Continued)

*Primary Examiner* — Paul N Dickson
*Assistant Examiner* — Timothy Wilhelm
(74) *Attorney, Agent, or Firm* — Howard & Howard Attorneys PLLC

(57) ABSTRACT

The damper and spring unit comprises a damper, a spring member extending coaxially to the damper, a bottom spring plate and a vehicle height adjustment device for adjusting the height of the vehicle from the ground. A first damper element is connected to a wheel carrier of the suspension and a second damper element is slidable relative to the first (Continued)

damper element along the longitudinal axis (z). The adjustment device is interposed between the first damper element and the spring member to change the linear position of the bottom spring plate, and a bottom end of the spring member, relative to the first damper element. A hydraulic linear actuator comprising a cylinder is secured to the first damper element and a piston drivingly connected for translation with the bottom spring plate along the longitudinal axis (z) of the damper between a bottom end-of-travel position and a top end-of-travel position.

7 Claims, 3 Drawing Sheets

(51) Int. Cl.
    *B60G 11/16*     (2006.01)
    *B60G 15/06*     (2006.01)
    *B60G 17/02*     (2006.01)
    *B60G 17/027*    (2006.01)

(52) U.S. Cl.
    CPC ....... *B60G 17/021* (2013.01); *B60G 17/0272* (2013.01); *B60G 2202/312* (2013.01); *B60G 2204/1242* (2013.01); *B60G 2206/41* (2013.01); *B60G 2500/30* (2013.01)

(56) References Cited

U.S. PATENT DOCUMENTS

| | | | |
|---|---|---|---|
| 5,401,053 A | 3/1995 | Sahm et al. | |
| 5,961,106 A * | 10/1999 | Shaffer | B60G 13/008 267/221 |
| 6,854,722 B2 * | 2/2005 | Causemann | B60G 15/063 267/221 |
| 7,077,390 B2 * | 7/2006 | Miller | B60G 15/063 267/221 |
| 7,784,800 B2 * | 8/2010 | Michel | B60G 7/04 267/175 |
| 9,108,484 B2 * | 8/2015 | Reybrouck | B60G 17/0272 |
| 9,162,548 B1 * | 10/2015 | Wakeman | B62D 21/00 |
| 2004/0159993 A1 * | 8/2004 | Miller | B60G 15/063 267/179 |
| 2009/0302559 A1 * | 12/2009 | Doerfel | B60G 15/065 280/5.519 |
| 2016/0159191 A1 * | 6/2016 | Seminara | B60G 15/063 267/218 |

OTHER PUBLICATIONS

International Preliminary Report on Patentability dated Nov. 23, 2015 for PCT International Application No. PCT/EP2014/069829.
Italian Application No. ITTO20100695 filed Aug. 13, 2010 in the name of Sistemi Sospensioni S.p.A.

* cited by examiner

SUSPENSION STRUT FOR A MOTOR VEHICLE WITH A HEIGHT-ADJUSTMENT DEVICE

CROSS-REFERENCE TO RELATED APPLICATIONS

The present application is a National Stage of International Patent Application No. PCT/EP2014/069829, filed on Sep. 17, 2014, which claims priority to and all the benefits of European Patent Application No. 13184830.1, filed on Sep. 17, 2013, both of which are hereby expressly incorporated herein by reference in their entirety.

BACKGROUND OF THE INVENTION

1. Field of the Invention

The present invention relates to a damper and spring unit for a vehicle suspension, particularly for a MacPherson suspension, provided with a vehicle height adjustment device for adjusting, i.e. for changing in a controlled manner, the height of the body of the vehicle from the ground.

2. Description of the Related Art

It is known to use height adjustment devices of the above-mentioned type on vehicle suspensions. These devices are used for example on so-called SUVs (Sport Utility Vehicles), in order to position the vehicle body at a greater height from the ground when the vehicle is running off road and at a smaller height from the ground when the vehicle running on road, especially at high speed. These devices are also typically used on sport cars, whose height from the ground is normally reduced to ensure better driving conditions at high speed, in order to allow to lift the vehicle body from the ground during particular manoeuvres, for example to enter or leave areas delimited by steep ramps, as well as to allow to drive the vehicle on a snowy road or in any other driving conditions for which it is preferable to have a height from the ground greater than the normal one.

Italian patent application No. ITTO20100695 in the Applicant's name discloses a damper and spring unit for a MacPherson suspension, comprising a device for adjusting the height of the vehicle from the ground which is made as a hydraulic linear actuator and is interposed between a top end of the spring and the vehicle body to change in a controlled manner the distance between the top end of the spring and the vehicle body. More specifically, the device comprises a cylinder coupled to the vehicle body and a piston which is slidable along the longitudinal axis of the cylinder and rests on a top spring plate.

International patent application No. WO2012/156418, also in the Applicant's name, discloses a damper and spring unit for a MacPherson suspension with a device for adjusting the height of the vehicle from the ground that is made as a hydraulic linear actuator and is interposed between the damper and the spring to change in a controlled manner the linear position of the bottom end of the spring relative to the damper cylinder, and hence relative to the axis of the wheel. More specifically, the device comprises a cylinder coupled to the damper cylinder and a piston that is slidable along the longitudinal axis of the cylinder and rests on a bottom spring plate. An adjustment device of this type, that is to say of the type interposed between the damper cylinder (as part of the suspension which is drivingly connected to the wheel carrier) and a bottom end of the spring, has the advantage, with respect to the other known solution discussed above, that it does not increase the vertical size of the suspension, but the disadvantage that it increases the radial size in the bottom area of the damper and spring unit, in which area the available space is usually very small.

SUMMARY OF THE INVENTION

It is an object of the present invention to provide a damper and spring unit for a vehicle suspension, particularly for a MacPherson suspension, with a device for adjusting the height of the vehicle from the ground that has smaller sizes, in particular in the bottom area of the unit, than the prior art.

This and other objects are fully achieved according to the invention by virtue of a damper and spring unit for a vehicle suspension, particularly for a MacPherson suspension, comprising a damper, a spring member and a vehicle height adjustment device for adjusting the height of the body of the vehicle from the ground. The damper includes a first element adapted to be firmly connected to a wheel carrier and a second element that is slidable with respect to the first one along a longitudinal axis of the damper. The spring member extends coaxially to the damper and rests at its bottom against a bottom spring plate. The adjustment device is interposed between the first damper element and the spring member to change in a controlled manner the linear position of the bottom spring plate, and hence of the bottom end of the spring member, relative to the first damper element along the longitudinal axis of the damper, and is made as a hydraulic linear actuator comprising a cylinder firmly secured to the first damper element and a piston connected to the bottom spring plate so as to move with this latter along the longitudinal axis of the damper between a bottom end-of-travel position, corresponding to the minimum height of the vehicle from the ground, and a top end-of-travel position, corresponding to the maximum height of the vehicle from the ground, and wherein the piston of the adjustment device is arranged, at least for the largest part of its longitudinal size, within the spring member.

By virtue of the adjustment device being fully, or almost fully, received within the spring member, the presence of the adjustment device does not significantly increase the size of the damper and spring unit.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

In the following description and claims, terms such as "top" and "bottom", "vertical" and "horizontal" and the like are to be intended as referring to the mounted condition of the suspension on the vehicle. Moreover, the terms "axial" and "longitudinal" are used herein to identify the direction of the longitudinal axis of the hydraulic linear actuator acting as adjustment device (which axis coincides, in the mounted condition of the adjustment device on a MacPherson suspension, with the axis of the damper), while the terms "radial" and "transverse" are used to identify a direction lying in a plane perpendicular to that axis.

Figure 1:
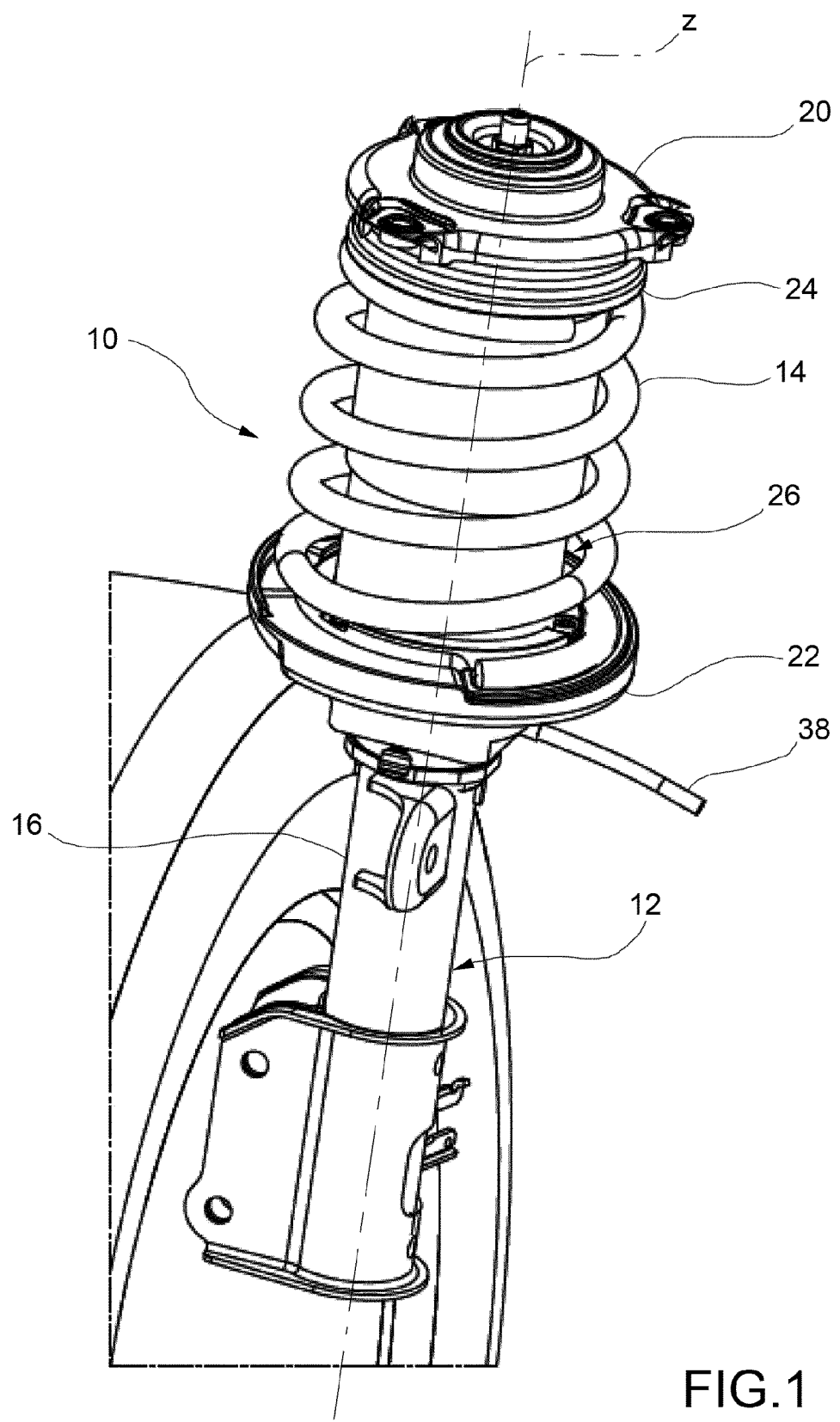
FIG. 1 is an isometric view of a damper and spring unit for a MacPherson vehicle suspension having a device for adjusting the height of the vehicle from the ground according to the present invention.
Figure 2:
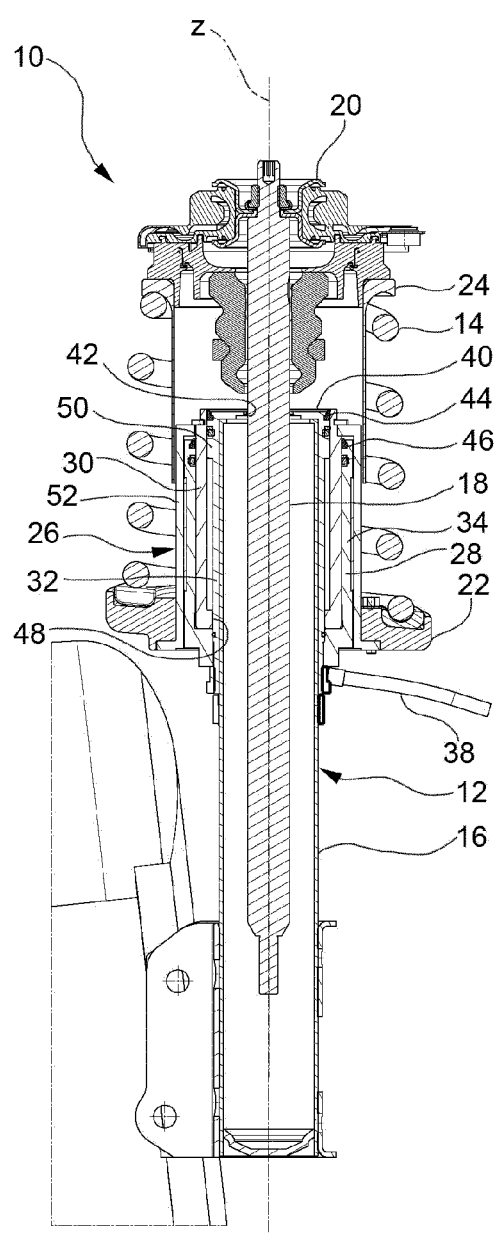
FIG. 2 is an axial section view of the damper and spring unit of FIG. 1, in the bottom end-of-travel position, corresponding to the minimum height of the vehicle body from the ground.
Figure 3:
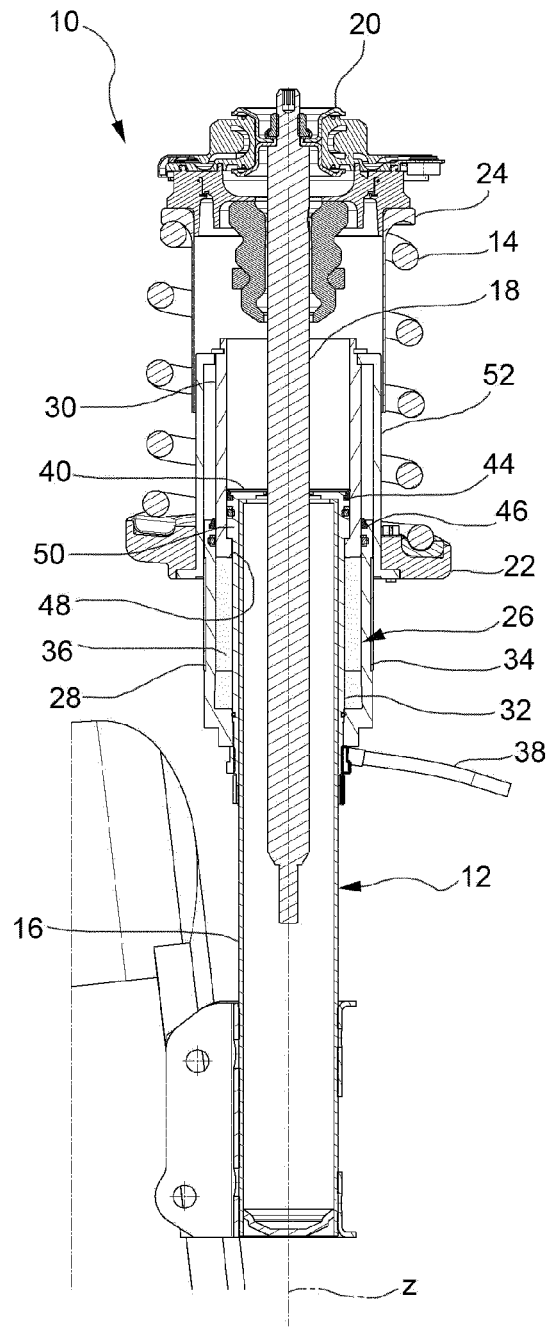
FIG. 3 is an axial section view of the damper and spring unit of FIG. 1, in the top end-of-travel position, corresponding to the maximum height of the vehicle body from the ground.

With reference first to FIGS. 1 to 3, a damper and spring unit for a MacPherson suspension for vehicle is generally indicated 10 and comprises, in per-se-known manner, a damper 12 and a spring member 14 arranged around the damper 12.

The damper 12 basically comprises a first damper element adapted to be firmly connected to a wheel-carrying strut (not shown) and a second damper element slidable relative to the first one along a longitudinal axis (indicated z) of the damper. Preferably, said first and second damper elements are a cylinder 16 extending along the longitudinal axis z and a piston (not shown) slidably received in the cylinder 16 to slide along the longitudinal axis z, respectively. A rod 18 is drivingly connected for translation with the piston, extends coaxially to the cylinder 16 and is fixed at its top end to the vehicle body (not shown) by a top mount 20.

Preferably, the spring member 14 is made as a coil spring. The spring member 14 rests at its bottom against a bottom spring plate 22 and at its top against a top spring plate 24. The top spring plate 24 is vertically interposed between the top end of the spring member 14 and the top mount 20.

The damper and spring unit 10 further comprises a vehicle height adjustment device 26 (hereinafter simply referred to as "adjustment device") for adjusting the height of the vehicle body from the ground. The adjustment device 26 is made as a hydraulic linear actuator and is interposed between the first damper element (the cylinder 16, according to the embodiment illustrated in FIGS. 1 to 3) of the damper 12 and the bottom spring plate 22 so as to allow to adjust the position of the spring member 14 relative to the cylinder 16 of the damper 12 along the longitudinal axis z. Since, at least in the direction of the longitudinal axis z (which is a vertical direction, or in any case a direction having, as its main component, the vertical one), the spring member 14 is drivingly connected to the vehicle body and the cylinder 16 of the damper 12 is drivingly connected to the wheel carrier (which is placed at a fixed distance from the ground, determined by the diameter of the wheel), adjusting the position of the spring member 14 relative to the cylinder 16 of the damper 12 along the longitudinal axis z involves adjusting the height of the vehicle body from the ground.

With reference in particular to FIGS. 2 and 3, preferably the adjustment device 26 comprises a cylinder 28, which is coupled to the cylinder 16 of the damper 12 so as to be drivingly connected for translation with the latter in the direction of the longitudinal axis z, and a piston 30, which is coupled to the bottom spring plate 22 so as to be drivingly connected for translation with the latter in the direction of the longitudinal axis z.

According to the embodiment illustrated in FIGS. 1 to 3, the cylinder 28 of the adjustment device 26 is made as an annular cylinder and is arranged around a top end portion of the cylinder 16 of the damper 12. Preferably, the cylinder 28 of the adjustment device 26 comprises an inner cylindrical element 32 and an outer cylindrical element 34 that are arranged coaxially to each other so as to enclose a pressure chamber 36 of annular shape. The pressure chamber 36 is selectively connectable, through a tube 38 and valve (not shown), to a source of fluid under pressure or a tank (both not shown). Preferably, the inner cylindrical element 32 is secured to the cylinder 16 of the damper 12 so as to be drivingly connected for rotation therewith around the longitudinal axis z. The inner cylindrical element 32 comprises (preferably formed in a single piece with the inner cylindrical element 32 itself) a top cap 40 which closes the cylinder 16 of the damper 12 at its top end and has a through hole 42 through which the rod 18 of the damper 12 slides. The inner cylindrical element 32 and the outer cylindrical element 34 of the cylinder 28 of the adjustment device 26 are provided with respective seal members 44 and 46, of per-se-known type, which cooperate with the piston 30 to seal the pressure chamber 36.

The piston 30 of the adjustment device 26 is made as a an annular piston and is slidably arranged in the pressure chamber 36 to slide between a bottom end-of-travel position (FIG. 2) and a top end-of-travel position (FIG. 3). In one embodiment, the piston 30 has at its bottom end a shoulder 48, i.e. a portion with an enlarged cross-section, which in the bottom end-of-travel position abuts at its bottom against the bottom of the pressure chamber 36 and in the top end-of-travel position abuts at its top against a shoulder 50 formed by the inner cylindrical element 32 of the cylinder 28 of the adjustment device 26.

In case of use of the adjustment device 26 on MacPherson suspensions for steering wheels, an anti-rotation feature will be provided, in per-se-known manner, for preventing the piston 30 from rotating around the longitudinal axis z relative to the cylinder 28 of the adjustment device 26, and hence relative to the cylinder 16 of the damper 12.

A connection member 52, preferably made in the shape of an inverted cup which is arranged coaxially to the piston 30 and has an axial size larger than that of the piston 30, is associated to the piston 30 of the adjustment device 26, whereby the piston 30 is fully contained in the volume of the connection member 52. The connection member 52 is connected on the one hand to the piston 32 and on the other to the bottom spring plate 22 so as to drivingly connect these two components for translation with each other along the longitudinal direction z. Supply of fluid under pressure in the pressure chamber 36 of the cylinder 28 of the adjustment device 26 causes extension (lift) of the piston 30 from the cylinder 28, and hence, via the connection member 52, lift of the spring member 14, and of the vehicle body therewith, with respect to the road surface. Discharge of the pressure chamber 36, on the contrary, causes retraction (lowering) of the piston 30 relative to the cylinder 28, and hence downward movement of the spring member 14, and of the vehicle body therewith.

As can be immediately noticed looking at FIGS. 2 and 3, the particular inverted-cup shape of the connection member 52 results in the piston 30 of the adjustment device 26 being contained, at least for the largest part of its longitudinal size, inside the volume of the spring member 14. This allows to greatly reduce the space taken by the adjustment device 26 outside of the spring member 14 and hence to correspondingly limit problems of interference with other members of the suspension and/or of the vehicle on which the damper and spring unit is to be mounted.

Figure 4:
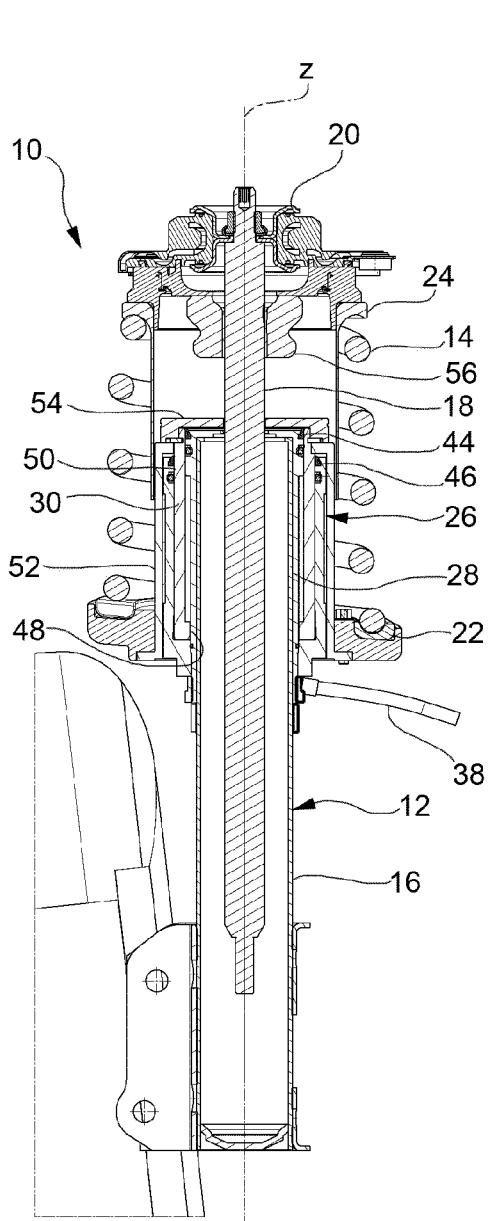
FIG. 4 is an axial section view of a damper and spring unit according to a variant embodiment of the present invention, in the bottom end-of-travel position, corresponding to the minimum height of the vehicle body from the ground.
Figure 5:
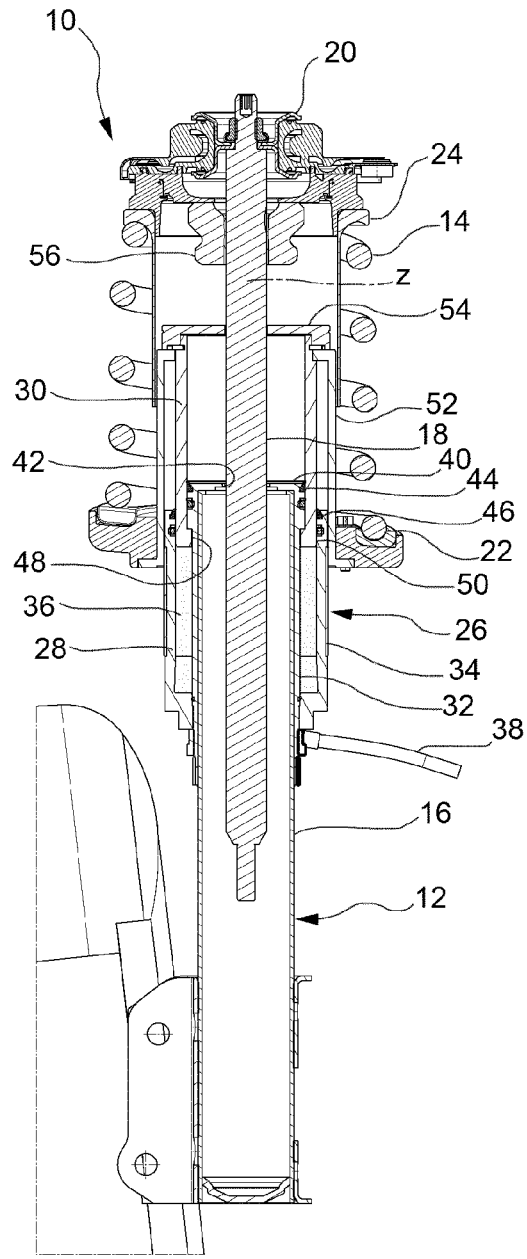
FIG. 5 is an axial section view of a damper and spring unit according to a variant embodiment of the present invention, in the top end-of-travel position, corresponding to the minimum height of the vehicle body from the ground.

Another embodiment of a damper and spring unit with a device for adjusting the height of the vehicle from the ground according to the present invention is shown in the section views of FIGS. 4 and 5, where parts and elements identical or corresponding to those of FIGS. 2 and 3 have been given the same reference numerals. The embodiment of FIGS. 4 and 5 is substantially identical to that of FIGS. 2 and 3, and therefore this embodiment is not described herein in detail, but reference is made to the above description of the embodiment of FIGS. 2 and 3. The difference with the embodiment of FIGS. 2 and 3 is that the embodiment of FIGS. 4 and 5 provides for a cap 54 mounted on the piston 30 of the adjustment device 26 to form an abutment surface for a buffer 56 of the damper 12. In this way, in so-called buffering conditions, i.e. when the damper reaches the end of the compression travel, the buffering load is applied on the piston 30 of the adjustment device 26, rather than on the cylinder 28, and via this latter, on the cylinder 16 of the damper 12 (as it happens, on the other hand, with the embodiment of FIGS. 2 and 3, where the buffer cooperates with the cap 40 of the cylinder 28 of the adjustment device 26). Apart from that, what has already been stated above in connection with the embodiment of FIGS. 2 and 3 still applies to this variant embodiment.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A damper and spring unit for a vehicle suspension comprising a damper having a longitudinal axis (z), a spring member extending coaxially to the damper, a bottom spring plate against which the spring member rests at its bottom and a vehicle height adjustment device for adjusting the height of the vehicle from the ground, wherein the damper includes a first damper element adapted to be firmly connected to a wheel carrier of the suspension and a second damper element slidable relative to the first damper element along the longitudinal axis (z), wherein the adjustment device is interposed between the first damper element and the spring member to change in a controlled manner the linear position of the bottom spring plate, and hence of a bottom end of the spring member, relative to the first damper element along the longitudinal axis (z) and is made as a hydraulic linear actuator comprising a cylinder firmly secured to the first damper element and a piston connected to the bottom spring plate so as to be drivingly connected for translation therewith along the longitudinal axis (z) of the damper between a bottom end-of-travel position, corresponding to the minimum height of the vehicle from the ground, and a top end-of-travel position, corresponding to the maximum height of the vehicle from the ground, and wherein the piston of the adjustment device is arranged, at least for the largest part of its longitudinal size, within the spring member.

2. The damper and spring unit as set forth in claim 1, wherein said first and second damper elements are a cylinder and a rod, respectively.

3. The damper and spring unit as set forth in claim 2, wherein the cylinder of the adjustment device is arranged around a top end portion of the first damper element and is made as an annular cylinder, with an inner cylindrical element and an outer cylindrical element which are arranged coaxially to each other so as to enclose a pressure chamber of annular shape, and wherein the piston of the adjustment device is made as an annular piston and is slidably arranged in the pressure chamber between a bottom end-of-travel position and a top end-of-travel position.

4. The damper and spring unit as set forth in claim 3, wherein the inner cylindrical element of the cylinder of the adjustment device is secured to the first damper element so as to be drivingly connected for rotation therewith around the longitudinal axis (z).

5. The damper and spring unit as set forth in claim 3 or claim 4, wherein the adjustment device further comprises a connection member which is arranged coaxially to the piston of the adjustment device and has an axial size greater than that of the piston, whereby the piston is fully arranged within the volume of the connection member, and wherein the connection member is connected on the one hand to the piston and on the other to the bottom spring plate so as to drivingly connect the piston and the bottom spring plate for translation with each other along the longitudinal direction (z).

6. The damper and spring unit as set forth in claim 5, wherein the connection member of the adjustment device has an inverted-cup shape.

7. The damper and spring unit as set forth in claim 2, wherein the adjustment device further comprises a cap mounted on the piston of the adjustment device so as to provide an abutment surface for a buffer of the damper mounted on the second damper element.

* * * * *